United States Patent [19]
Steffes et al.

[11] Patent Number: 5,700,071
[45] Date of Patent: Dec. 23, 1997

[54] ELECTROHYDRAULIC PRESSURE CONTROL DEVICE

[75] Inventors: Helmut Steffes, Hattersheim; Dieter Dinkel, Eppstein/Ts; Gunther Vogel, Dreieich; Peter Volz, Darmstadt, all of Germany

[73] Assignee: ITT Automotive Europe GmbH, Frankfurt, Germany

[21] Appl. No.: 687,462

[22] PCT Filed: Jan. 25, 1995

[86] PCT No.: PCT/EP95/00266

§ 371 Date: Jul. 29, 1996

§ 102(e) Date: Jul. 29, 1996

[87] PCT Pub. No.: WO95/20510

PCT Pub. Date: Aug. 3, 1995

[30] Foreign Application Priority Data

Jan. 29, 1994 [DE] Germany ............... 44 02 735.4

[51] Int. Cl.⁶ ............... B60T 13/66; F15B 13/08
[52] U.S. Cl. ............... 303/119.2; 303/113.1
[58] Field of Search ............... 303/113.1, 119.2, 303/119.1; 251/129.01, 129.15, 129.21, 129.06; 439/140, 76, 672; 137/884, 596.17; 335/202; 336/192

[56] References Cited

U.S. PATENT DOCUMENTS 5,520,447  5/1996  Burgdorf et al. ............ 303/119.2

FOREIGN PATENT DOCUMENTS

| 0105219 | 4/1984 | European Pat. Off. . |
| 0379957 | 8/1990 | European Pat. Off. . |
| 0487173 | 5/1992 | European Pat. Off. . |
| 2637348 | 4/1990 | France . |
| 3742320 | 6/1989 | Germany . |
| 8910805 | 1/1991 | Germany . |
| 4001017 | 7/1991 | Germany . |
| 4100967 | 7/1992 | Germany . |
| 4108028 | 9/1992 | Germany . |
| 4108079 | 9/1992 | Germany . |
| 4135745 | 3/1993 | Germany . |
| 4132471 | 4/1993 | Germany . |
| 4133641 | 4/1993 | Germany . |
| 4232205 | 3/1994 | Germany . |
| WO8905746 | 6/1989 | WIPO . |
| WO8910286 | 11/1989 | WIPO . |
| WO9208630 | 5/1992 | WIPO . |
| WO 9212878 | 8/1992 | WIPO . |

OTHER PUBLICATIONS

English Translation of the International Preliminary Examination Report for application PCT/EP95/00266.
Search Report of the German Patent Office Application No. P4402735.4.

*Primary Examiner*—Douglas C. Butler
*Attorney, Agent, or Firm*—Thomas N. Twomey; J. Gordon Lewis

[57] ABSTRACT

The invention pertains to an electrohydraulic pressure control device, with electromagnetically actuated hydraulic valves, which are arranged on a valve-holding element, with coils which extend beyond the valve-holding element, whereby the coils are provided with electrical contact elements at their parts extending beyond the valve-holding element, with a cover which covers the extending coil parts and the contact element, with a support element to hold the coils, that are positioned within the cover, whereby the cover or a portion of the cover is designed as an electromagnetic controller or for holding the connecting parts of an electronic controller. An essentially plate-like carrier element facing the coils features several slots into which form- and/or pressure-locking closing devices are engaged projecting from the outer surface of the cover.

10 Claims, 2 Drawing Sheets

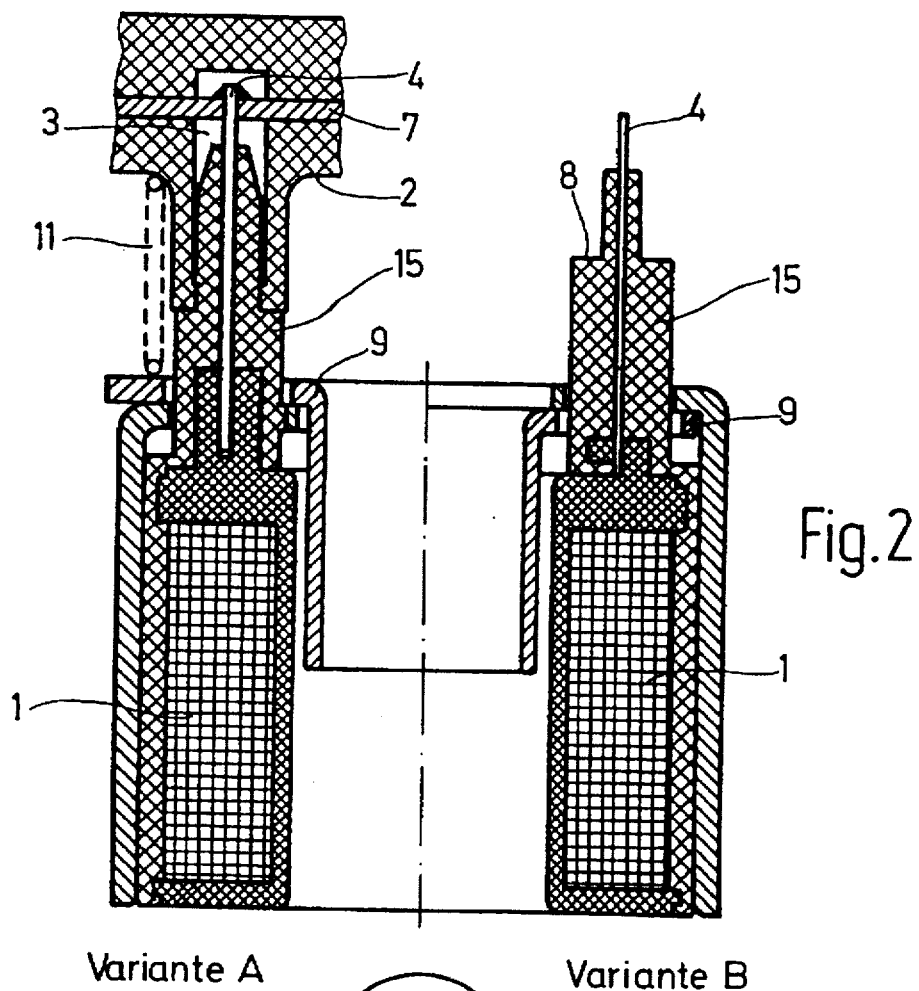
Variante A  Variante B
Fig.2
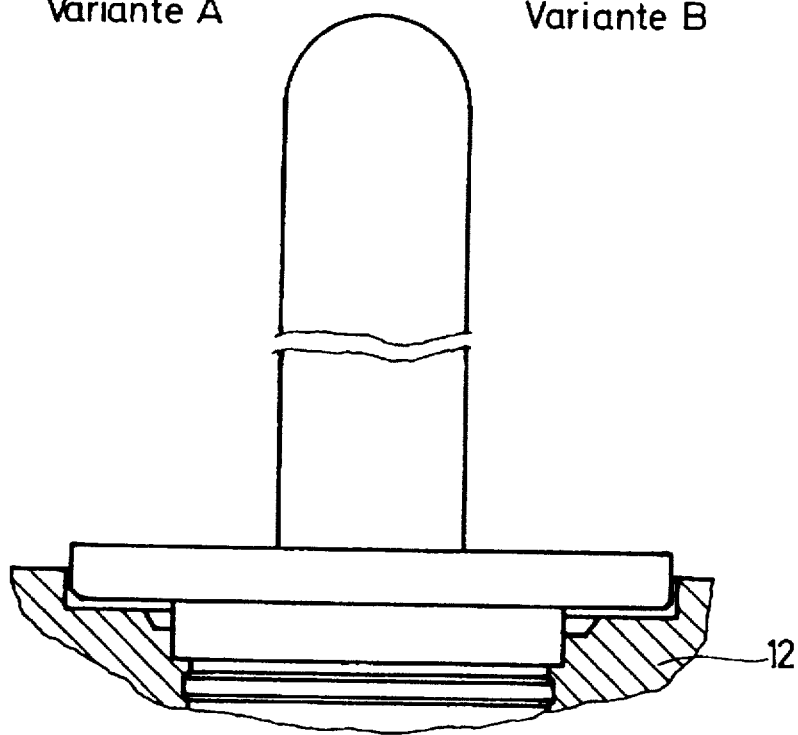

5,700,071

ELECTROHYDRAULIC PRESSURE CONTROL DEVICE

TECHNICAL FIELD

The invention pertains to an electrohydraulic pressure control device, in particular a brake pressure control device and to a method for producing one such pressure control device.

BACKGROUND OF THE INVENTION

An electrohydraulic pressure control device of the relevant kind is described, for example, in the international publication WO 92/12878. In this case, a previously known block design of the valve-holding element is used and the cover is divided by means of a plate-shaped support element in order to hold an electronic controller or parts of an electronic controller, and to establish the electrical connection between the electronic controller and the contact elements protruding at the electromagnetic valves. The cover with the coils of the electromagnetic valves is plugged into the valve domes of the valve-holding element, whereby plug contacts engage each other to establish the electrical connection between the contact elements and the electronic or electrical components integrated in the cover. To attach the coil to the support element it is suggested to use elastic mounts, for example, springs, or to embed the coils in an elastic molded element.

The purpose of the invention to improve the pressure control device known from the named state of the art in order to create a compact and functionally optimized combination of the coils in the support element, which can be easily produced and checked, whereby different thermal expansions of the components can be absorbed with as little stress as possible. Furthermore, a suitable method for production of such a pressure control device is to be created.

In this regard it is suggested that the support element facing the coils feature several slots into which shape and/or pressure locking closing devices are engaged, projecting from the outer surface of the cover. In this case, a particularly water-tight closure of the mount for the coils in the cover is obtained, which is particularly simple to produce and forms a prefabricated unit of the cover with the coils.

With regard to the production method it is proposed to install an appropriately prefabricated circuit path and/or a circuit board prefabricated as a punched grid into an injection mold, so that the injection molding compound fully encloses the circuit paths, whereby the support element protruding from the injection molding compound with the slots can be inverted over the premounted coil unit until the contact elements of the coils come into contact with the coils of the circuit paths. The slots are then sealed water-tight with suitable sealing materials in the form of casting compound, paint, hot adhesive or similar materials.

BRIEF DESCRIPTION OF THE DRAWINGS

FIG. 2: An alternative design of the coil configuration, shown enlarged.

DETAILED DESCRIPTION OF THE PREFERRED EMBODIMENTS

Figure 1:
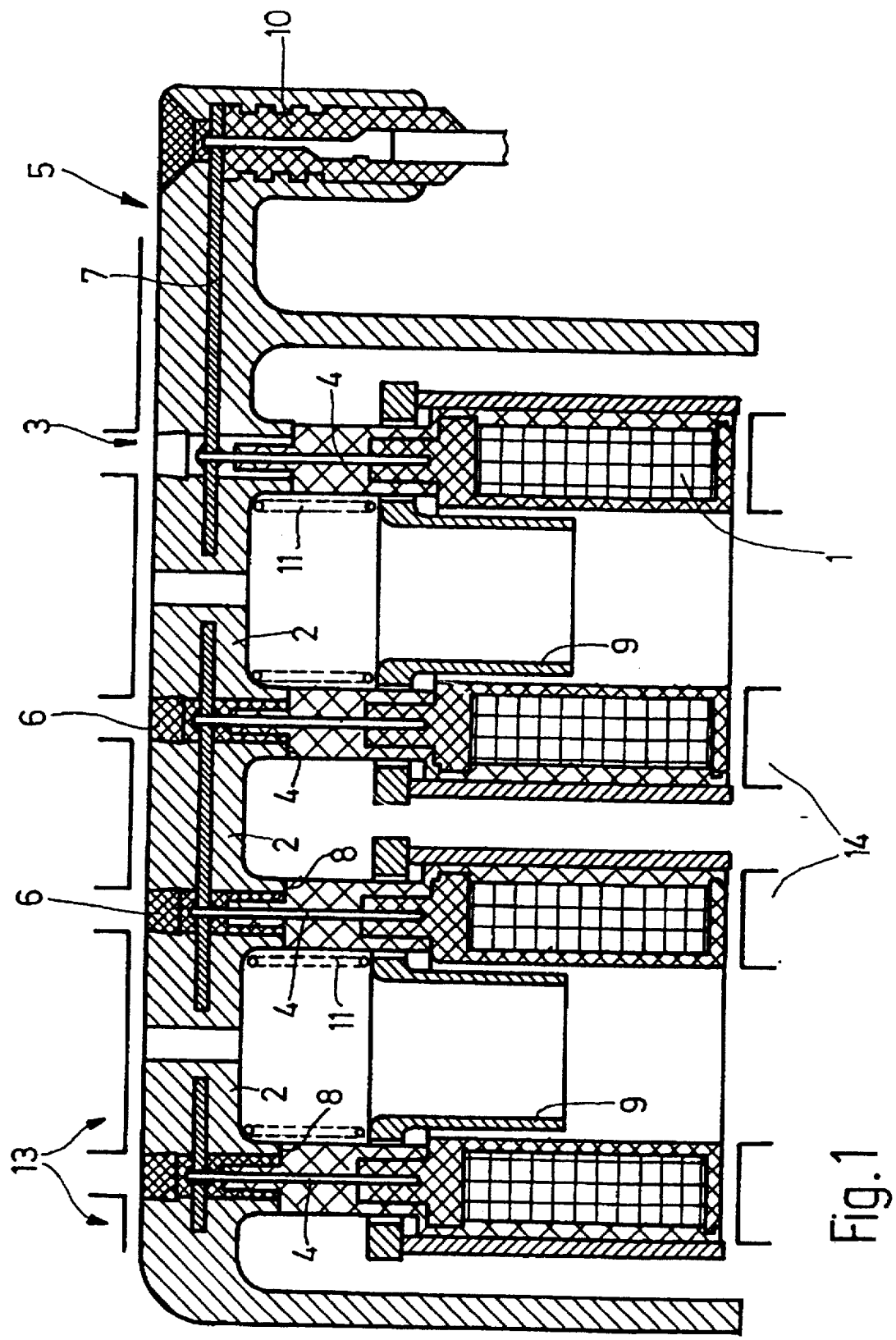
FIG. 1: The cover of an electrohydraulic pressure control device in cross section

FIG. 1 shows a side view of the pressure control device limited to the region of the cover 5, whose base forms the essentially plate-shaped support element 2, which is formed along its perimeter surface as a web-like wall section, which, after complete assembly, rests against the surface of the essentially block-shaped valve-holding element. The support element 2 thus forms a homogeneous unit with the cover material, which preferably is injection-molded from plastic. Cast in the support element 2 the circuit paths 7 are illustrated as a circuit board which extends nearly along the entire width and depth of the cover, so that a plug connection 10 located outside the cover wall is connected to the circuit paths 7 even across a protrusion at the cover 5.

For electrical contact of the coils with the circuit paths, according to the number of electrical contact elements 4 protruding from the coils 1, slots 3 are provided in the support element 2, into which the ends of the contact elements 4 are inserted until they are fixed in place at their insertion depth in the slots 3 due to the stop 8 of the coil element. Due to the corresponding positioning of the contact elements 4 in the openings of the circuit paths 7, according to the embodiment, from the outside an automatic soldering of the contact sites within the slots will be ensured. However, other methods of connection are possible, such as using a punched grid as circuit path, so that the contact elements 4 can be welded to the circuit path 7. A particularly simple connection is obtained by a snap-in or adhesion of the coil contacts in the circuit paths.

To guard against moisture and dirt the slots are provided with a closing device 6, which can be designed as elastic or as plastic material and can be cast or injected, for example, in the slots 3. Furthermore, paints and hot adhesives or similar corrosion-resistant fillers are suitable for sealing the slots 3. In the embodiment presented it is proposed to inject the fill material into the slots 3 under an appropriate high pressure through a schematically indicated spray tool 13, whereby for a uniform distribution and for filling of the entire lead opening, the circuit paths 7 protruding into the slots 3 have recesses that ensure the penetration of the filler up to the stop 8 of each lead opening 3. The hydraulic pressure thus acting on the front surface of the coil 1 is safely absorbed by the opposing support device 14, which is likewise indicated only schematically here.

The centering of the coils 1 on the valve domes (not explicitly illustrated in this figure), which protrude from the block-shaped valve holding element 12 as indicated in FIG. 2 and penetrate into the cavity of the coil 1 and/or of the cover 5, takes place by means of a radially displaceable yoke ring 9 which is placed under load by a compression spring 11 and ensures a compensation of radial play between the valve-holding element and the coil 1. At the same time, by means of the compression spring 11 a compression force is generated on the magnet yoke ring 9 which ensures a reliable contact of the external steel coil surface, so that the magnetic flux in the coil is closed. In the cover base and thus in the region of the support element 2 there are two additional holes, for example, which are intended to contribute to an additional ventilation of the cover interior and thus to a reduction of the formation of condensation water in the suspended valve block arrangement, i.e., after alignment of the cover 5 with the openings downward. However, the holes are of lesser importance to the essence of the invention.

In the illustrated embodiment of the cover 5 the plug connection 10 is run in the direction of the coils outward to a control and regulation unit necessary to drive the electromagnetic valves. However, it is also possible, given appropriate miniaturization or in appropriate space conditions, to integrate the electronic components of the control and regulation device within the cover, i.e., in support element 2, and thus to mold it to the circuit paths 7, i.e., to integrate it in the cover 5. An additional alternative for arrangement of the control and regulation electronics, not illustrated, arises from a corresponding formation of the cover upper section in the form of a frame, so that instead of the downward-directed plug connection 10, it is directed upward, in the opposite direction, and thus connected directly within the frame to the electronic components of a control and regulation electronics. Accordingly the frame of the cover would have to be protected from external, undesirable influences by a corrosion-resistant fill material or a separate closing cover.

That detail of the configuration of the contact element 4 which is extracted from the coil 1 in FIG. 2 will be discussed in greater detail. In the pressure control device according to this invention, it is evident that it differs from the previous design of the previous solution in the use of a separate contact pin inserted in the coil element 15 (insulating material) of the coil 1, and as is shown in variant B of FIG. 2, the design of the electrical contact element 4 as an exposed coil wire running directly from the insulating material of the coil 1 threaded into the opening of the circuit paths. This represents a particularly low-cost design. Just as in the previous design example, the yoke ring 9 is designed as a two-part, radially displaceable yoke ring to compensate for component tolerances between the coil and valve-holding element or valve dome. The stop 8 can feature an adhesive or a weld surface for attaching the coil element 15 to the support element 2. An alternative method of attachment is to set the tapered protrusion above the stop 8 for purposes of friction- or form-locking attachment of the coil 1 in the lead opening 3 of the support element 2 (variant A).

The particular advantages of the production method are that the circuit paths 7 are used as prefabricated circuit boards or as punched grids or similar material and are coated directly with the plastic in the injection tool, and thus form an integral unit within the cover 5 in order to hold the coil 1 and its associated parts. For each coil 1 there are two slots 3 already in the cover 5, supplied in the casting tool, so that a subsequent process to install the slots 3 is not necessary.

Similarly, during the injection process, the plug connection is molded to the housing. After completion of the cover 5, together with the two-part yoke ring 9, the compression springs 11 are inserted with the coil 1 into the cover in a manner such that the contact elements 4 fit into the punched recesses of the circuit paths 7 protruding into the slots 3. The contact sites of the contact elements 4 can be securely joined with the circuit paths 7 as desired or as needed, by welding, soldering or simply by clamping. The exposed sites between the contact elements 4 and the circuit paths 7 are then sealed with molding compound, paint, hot adhesive or an additional spray process. If the contact sites in the cover are sealed by an injection molding method, then the cover is used as a part of the tool, so that the injection tool can be set directly onto the cover outer surface only through a corresponding support device, absorbing the peak pressure and located at the underside of the coil 1, and the injection compound is pressed into the slots 3.

We claim:

1. Electrohydraulic pressure control device, in particular brake pressure control device including electromagnetically actuated hydraulic valves, which are arranged on a valve-holding element, with coils which extend over the valve-holding element, wherein the coils are provided with electrical contact elements at their parts extending beyond the valve-holding element, with a cover which covers the extending coil parts and the contact elements, with a support element to hold the coils, that are positioned within the cover, wherein the cover or a portion of the cover is designed as electromagnetic controller or for holding the connecting parts of an electronic controller, comprising:

a plate-like carrier element facing the coils includes several slots, pressure-locking closing devices residing in said slots of said carrier element and which project from the outer surface of the cover.

2. Electrohydraulic pressure control device according to claim 1, wherein the slots hold electrical contact elements of the coils which are connected to electrical circuit paths extending into the slots.

3. Electrohydraulic pressure control device according to claim 1, wherein the electrical contact elements extend as exposed coil wires directly from the housing of the coils and the contact elements reach the cover with the circuit paths by means of a stop at the support element.

4. Electrohydraulic pressure control device according to claim 3, wherein the stop is provided as a step in a protrusion of the coil element which is penetrated by one contact element, and that the protrusion is held shape- and/or pressure-locking against the lead opening.

5. Electrohydraulic pressure control device according to claim 1, wherein the coil is covered by a yoke ring with radial free play.

6. Electrohydraulic pressure control device according to claim 1, wherein the circuit paths are integrated in the support element.

7. Electrohydraulic pressure control device according to claim 1, wherein the support element is combined as a single piece with the cover and that the support element is formed as a plug connection.

8. Method for producing an electrohydraulic pressure control device comprising the steps of:

installing circuit paths in an injection mold, recasting the circuit paths in the injection molding mold to a cover housing holding a support element, inverting a yoke ring over the coils, positioning a compression spring between the yoke ring and the support element in the cover, and pushing the completed coils with their contact elements into contact with the circuit paths in the slots of the support element produced from the injection molding and are sealed with closing devices from the outer surface of the cover.

9. Method for producing an electrohydraulic pressure control device according to claim 8, wherein the connection of the contact elements with the circuit paths is produced by soldering or welding.

10. Method for producing an electrohydraulic pressure control device according to claim 8, wherein the closing devices are supplied by spraying at least one of a casting material, paint, and hot adhesive into the slots, so that the cover forms a constituent of the injection molding tool on which a spray tool with spray nozzles aligned to the slots is set and whereby opposite the spray tool there is a support device which presses the coils against the support element in order to absorb the spray pressure transferred to the coils during injection molding.

* * * * *